US008032169B2

(12) United States Patent
Abbate et al.

(10) Patent No.: US 8,032,169 B2
(45) Date of Patent: Oct. 4, 2011

(54) SYSTEM AND METHOD FOR PROVIDING LOW OVERHEAD FLOOR CONTROL IN A DISTRIBUTED PEER-TO-PEER COMMUNICATIONS NETWORK

(75) Inventors: Alain D. Abbate, Coral Springs, FL (US); Subhash P. Nair, Davie, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 755 days.

(21) Appl. No.: 11/946,221

(22) Filed: Nov. 28, 2007

(65) Prior Publication Data

US 2009/0137263 A1 May 28, 2009

(51) Int. Cl.
*H04Q 7/20* (2006.01)
(52) U.S. Cl. ........ 455/518; 455/519; 455/500; 455/517; 455/426.1; 455/414.1; 370/310; 370/328; 370/329; 370/343; 370/350; 709/203; 709/204; 709/218; 709/219
(58) Field of Classification Search .................. 455/518, 455/519, 517, 501, 500, 422.1, 403, 414.1–414.4, 455/550.1, 445, 466, 426.1, 426.2; 370/310, 370/328, 329, 343, 350; 709/203, 204, 218, 709/219
See application file for complete search history.

(56) References Cited

U.S. PATENT DOCUMENTS

| 6,212,562 | B1 | 4/2001 | Huang |
| 6,798,755 | B2 | 9/2004 | Lillie et al. |
| 7,697,949 | B2 * | 4/2010 | Yoshida et al. ............... 455/518 |
| 2004/0010549 | A1 | 1/2004 | Matus et al. |
| 2006/0059266 | A1 | 3/2006 | Ludwig et al. |
| 2006/0080407 | A1 | 4/2006 | Rengaraju |
| 2006/0154681 | A1 * | 7/2006 | Park et al. ....................... 455/518 |
| 2006/0178160 | A1 * | 8/2006 | Hans et al. ...................... 455/518 |
| 2007/0019595 | A1 | 1/2007 | Huh et al. |
| 2007/0121872 | A1 | 5/2007 | Hans et al. |

(Continued)

FOREIGN PATENT DOCUMENTS

WO 0057656 A1 9/2000

OTHER PUBLICATIONS

PCT/US2008/078260, PCT Search Report and Written Opinion, mailed Feb. 19, 2009, 15 pages.

(Continued)

*Primary Examiner* — Keith T Ferguson
(74) *Attorney, Agent, or Firm* — Barbara R. Doutre; Anthony P. Curtis; Daniel R. Bestor (57) ABSTRACT

A system and method for providing low overhead floor control in a distributed control two-way radio communications network (200) including one or more subscriber stations (201, 205, 213, 215, 217) and one or more peer stations (203, 207, 211) interconnected via an Internet connection (209) using no central control. A subscriber station (201) utilizes a floor request during a timed floor request window (FRW) for requesting floor control to a given peer station (203). The system and method provide for consistent floor control decisions throughout the communications network (200) which includes a policy to block additional floor requests from local subscriber stations once an initial floor request has been received. This enables each peer to receive an identical set of floor requests as every other peer within the FRW such that every peer will grant the floor to the same subscriber.

30 Claims, 4 Drawing Sheets

U.S. PATENT DOCUMENTS

2008/0102869 A1* 5/2008 Shaffer et al. ............... 455/518
2008/0319783 A1 12/2008 Yao et al.

OTHER PUBLICATIONS

Garcia-Luna-Aceves, J J et al.: "Floor Control Alternatives for Distributed Videoconferencing over IP Networks", Collaborative Computing: Networking, Applications and Worksharing, 200 5 International Conference on San Jose, CA, USA Dec. 19-21, 2005, Piscataway, NJ, USA, IEEE, Dec. 19, 2005, pp. 1-10.

Banik, S. M. et al.: "Distributed Floor Control Protocols for Computer Collaborative Applications on Overlay Networks", Collaborative Computing: Networking, Applications and Worksharing, 200 5 International Conference on San Jose, CA, USA Dec. 19-21, 2005, Piscataway, NJ, USA, IEEE, Dec. 19, 2004, pp. 1-10.

Camarillo et al: "The Binary Floor Control Protocol (BFCP); rfc4582.txt", Internet Engineering Task Force, Nov. 1, 2006, pp. 1-65.

Koskelainen et al.: "Requirements for Floor Control Protocols; rfc4376.txt", Internet Engineering Task Force, Feb. 1, 2006, pp. 1-14.

USPTO Office Action, Non-Final Rejection, U.S. Appl. No. 11/926,686, dated Jan. 21, 2010, 25 pages.

USPTO Office Action, Non-Final Rejection, U.S. Appl. No. 12/210,644, dated Feb. 3, 2010, 23 pages.

Camarillo et al, The Binary Floor Control Protocol (BFCP), XCON Working Group, Nov. 29, 2005, 64 pages.

PCT International Search Report Application No. PCT/US2008/083285 Dated Mar. 31, 2009—14 pages.

Motorola: "Motobridge IP System Overview" Stars Contract Commonwealth of Virginia (Modification #18)—10 pages.

Jiun-Ren Lin et al.: "iPTT: Peer to Peer Push-To-Talk for VoIP" Dated Nov. 20, 2006—26 pages.

USPTO Notice of Panel Decision From Pre-Appeal Brief Review for U.S. Appl. No. 12/210,644 Dated May 9, 2011.

PCT Preliminary Report on Patentability for Related Application PCT/US2008/078260 Dated May 14, 2010; 8 Pages.

* cited by examiner

SYSTEM AND METHOD FOR PROVIDING LOW OVERHEAD FLOOR CONTROL IN A DISTRIBUTED PEER-TO-PEER COMMUNICATIONS NETWORK

RELATED APPLICATIONS

This application is related to application Ser. No. 11/926,686, filed Oct. 29, 2007, titled "Floor Control In A Communications System" and application Ser. No. 12/210,644, filed Sep. 15, 2008, titled "Floor Control In a Communication System" commonly owned and assigned to Motorola, Inc.

FIELD OF THE INVENTION

An embodiment of the present invention is directed to distributed control peer-to-peer radio communications networks and more particularly to a low overhead floor control method for a peer-to-peer radio communications network.

BACKGROUND

Figure 1:
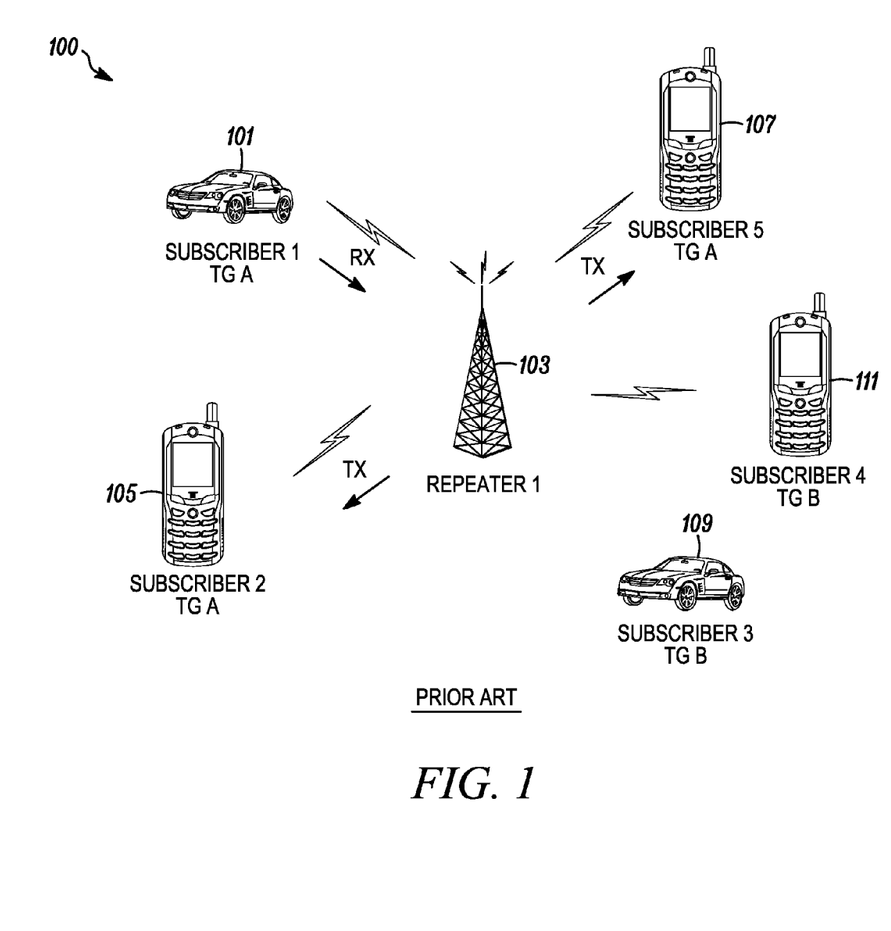
FIG. 1 is a prior art block diagram of a single repeater system using a first and second talkgroup.

Repeater systems used in two-way radio communications enable users to communicate with a radio repeater which presumably is in an optimal location which acts to rebroadcast a message to one or more users around some coverage area. FIG. 1 is a prior art block diagram illustrating a single repeater system 100 where a subscriber 101 in a talkgroup A (TG A) presses the radio push-to-talk (PTT) and the repeater 103 receives a voice message from the subscriber 101 and transmits the message to all members of TG A, such as subscriber 105 and subscriber 107. Thus, in the single repeater system, those subscribers, such as subscriber 109 and subscriber 111, that are characterized as "polite" in other talk groups (e.g. TG B), will recognize that the channel is busy and do not transmit in order to prevent interference.

A peer-to-peer (P2P) radio system consists of two or more peers (repeaters) that are typically linked together over an internet protocol (IP) network where two or more subscriber two-way radio devices use the network to communicate over a greater range. Subscribers may participate in private calls, such as a one-to-one voice/data communication, or in group calls, such as a one-to-N voice/data communication where one subscriber is talking and N subscribers are listening. These subscriber stations require resources from peers in order to communicate with one other. For example, a subscriber can communicate with another subscriber co-located on the same peer (using the peer as an RF repeater), or with another subscriber on another peer. For voice communication in a dispatch system, short latency times in delivering the audio message is often a stringent requirement.

One problem in radio systems deals in situations where the number of subscribers that desire to transmit over one or more peers at the same time exceeds the number of available RF channels. In low cost P2P radio systems, the system may only have sufficient resources for one of the subscribers to transmit at one time. Although many subscribers may simultaneously be contending to communicate to other subscribers over the radio system, only one may transmit at a time on a given RF channel. Consequently, each of the peers will be responsible for determining which subscriber will be allowed to transmit. A subscriber which is transmitting using a given peer or peers is generally said to "have the floor" which gives the subscriber exclusive use to transmit to one or more other subscribers.

Thus, it would be advantageous to operate a low cost P2P communications system where a reliable means is used to arbitrate between contending subscribers that both require substantially simultaneous use of the floor.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for providing low overhead floor control in a distributed peer-to-peer communications network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for providing low overhead floor control in a distributed peer-to-peer communications network. The non-processor circuits may include, but are not limited to, a radio receiver, a radio transmitter, signal drivers, clock circuits, power source circuits, and user input devices. As such, these functions may be interpreted as steps of a method to provide a low overhead floor control in a distributed peer-to-peer communications network.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

Figure 2:
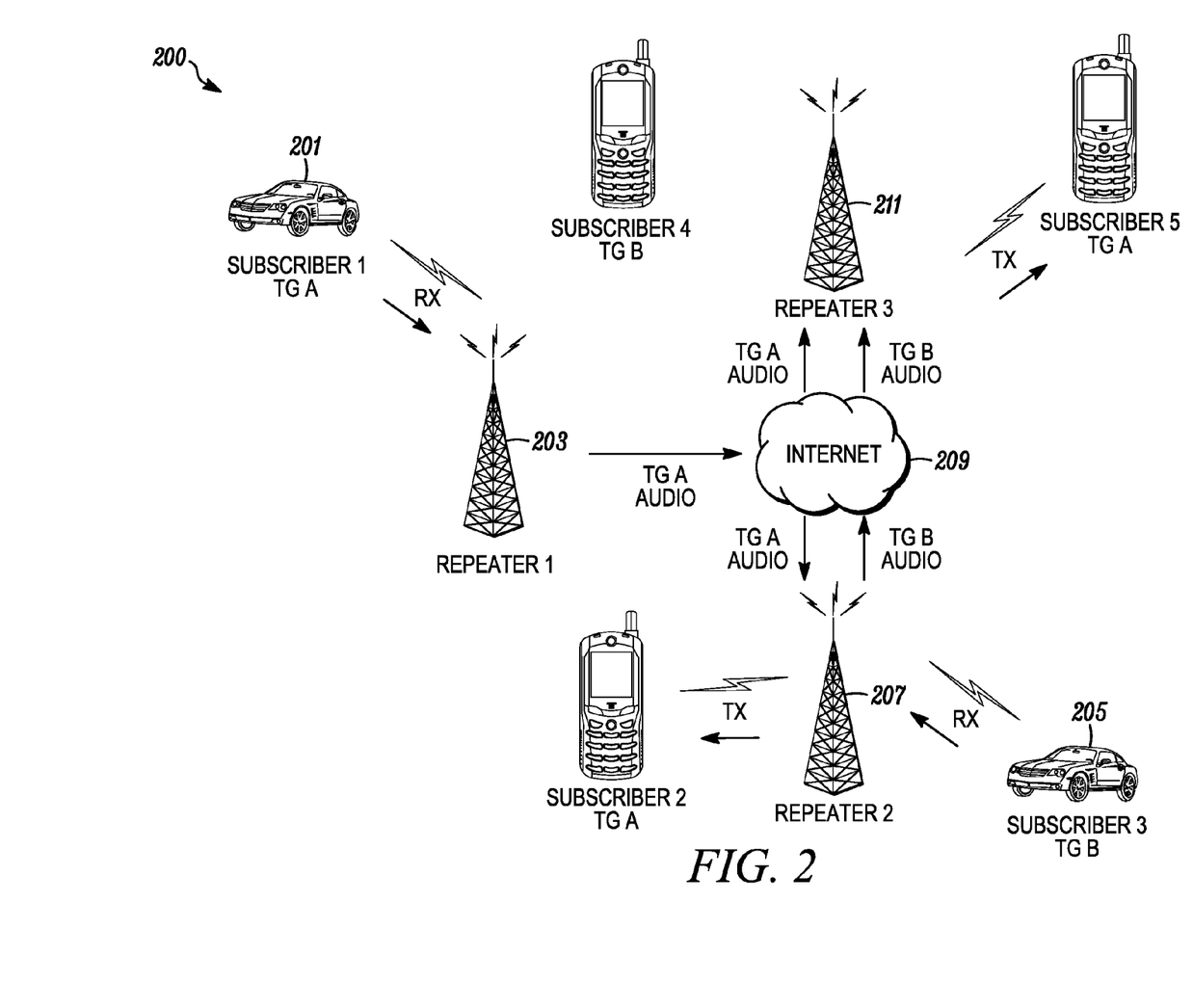
FIG. 2 is a block diagram of a multiple repeater system as used in accordance with an embodiment of the invention.

FIG. 2 is a block diagram of a multiple repeater system 200 as used in accordance with an embodiment of the invention. Thus, FIG. 2 is an example showing a subscriber 201 on a first repeater or peer 203 may press a PTT on his radio to initiate a voice call to a first talk group such as TG A. In some situations, a polite subscriber 205 on repeater 207 can initiate a voice call to a second talk group TG B at approximately the same moment in time. The voice streams for TG A and TG B are sent though an Internet connection 209 and both arrive at a third repeater 211 within a floor request window. As described herein, the floor request window (FRW) is that period of time upon which a subscriber requests use of the repeater system to communicate with other subscribers. Using the method for providing low overhead floor control in a distributed peer-to-peer communications network as described herein, the repeater 211 grants the floor to one of the voice streams, such as subscriber 201 in this example. Note that there is no central point of control in this radio communication network. Each peer repeater is responsible for floor control arbitration of the RF channels provided by that repeater. Consequently, repeaters 203, 207, and 211 in the system must make a consistent choice and grant the floor to the same initiating subscriber. An embodiment of this invention pertains to this selection process and a consistent method by which subscribers are granted the floor in the event of a substantially simultaneous request.

Thus, P2P floor control addresses two types of resource contention, namely: (1) Multiple subscribers contend for an radio frequency (RF) channel on a given peer. The subscribers could be seeking to start a private call or seeking to transmit on a group call. The contending subscribers could be affiliated with the same TG or could belong to different TGs. The peer must select a single subscriber and allocate the floor (the RF channel) to that subscriber. The peer must give priority to emergency calls over non-emergency calls. (2) Multiple subscribers belonging to a single TG contend to transmit to the members of that TG. The members of the TG can be located on multiple peers. Each peer with subscribers affiliated to that TG must allocate resources either for use by this TG, or for use by another TG, or for use by a private call. Within the set of peers that allocate resources to this TG, all peers must allocate the floor to the same subscriber. In other words, when a TG spans multiple peers, a single member of the TG can have the floor at any given point in time.

Multiple call priorities must be supported. For example, a voice call could be given a higher priority than a data call, or an emergency call could be given higher priority than a normal voice call. When two calls with different priorities request the floor, the floor should always be granted to the higher priority call. If the floor has been granted to a lower priority call, a higher priority call should be able to preempt the floor from the lower priority call. When two calls of the same priority are requested at different times, the floor should be granted to the call that is made first, and the second equal priority call should not be able to preempt the first call.

When two calls of the same priority are requested at the same time, a mechanism is needed to choose one call over another, i.e., to award the floor. One example might be to award the floor to the subscriber with the lower subscriber identification (ID). Methods used to select which of the equal priority calls is selected are outside the scope of this invention, however any method is acceptable provided it produces a consistent result on all peers. Although the peers in the distributed system do not share a common real time clock, when subscribers on two different peers originate a call at substantially the same time, this time period for these two floor requests shall mean that the two originations occur within a span of time equal to the maximum expected message delay for sending a message between any two peers in the network.

Figure 3:
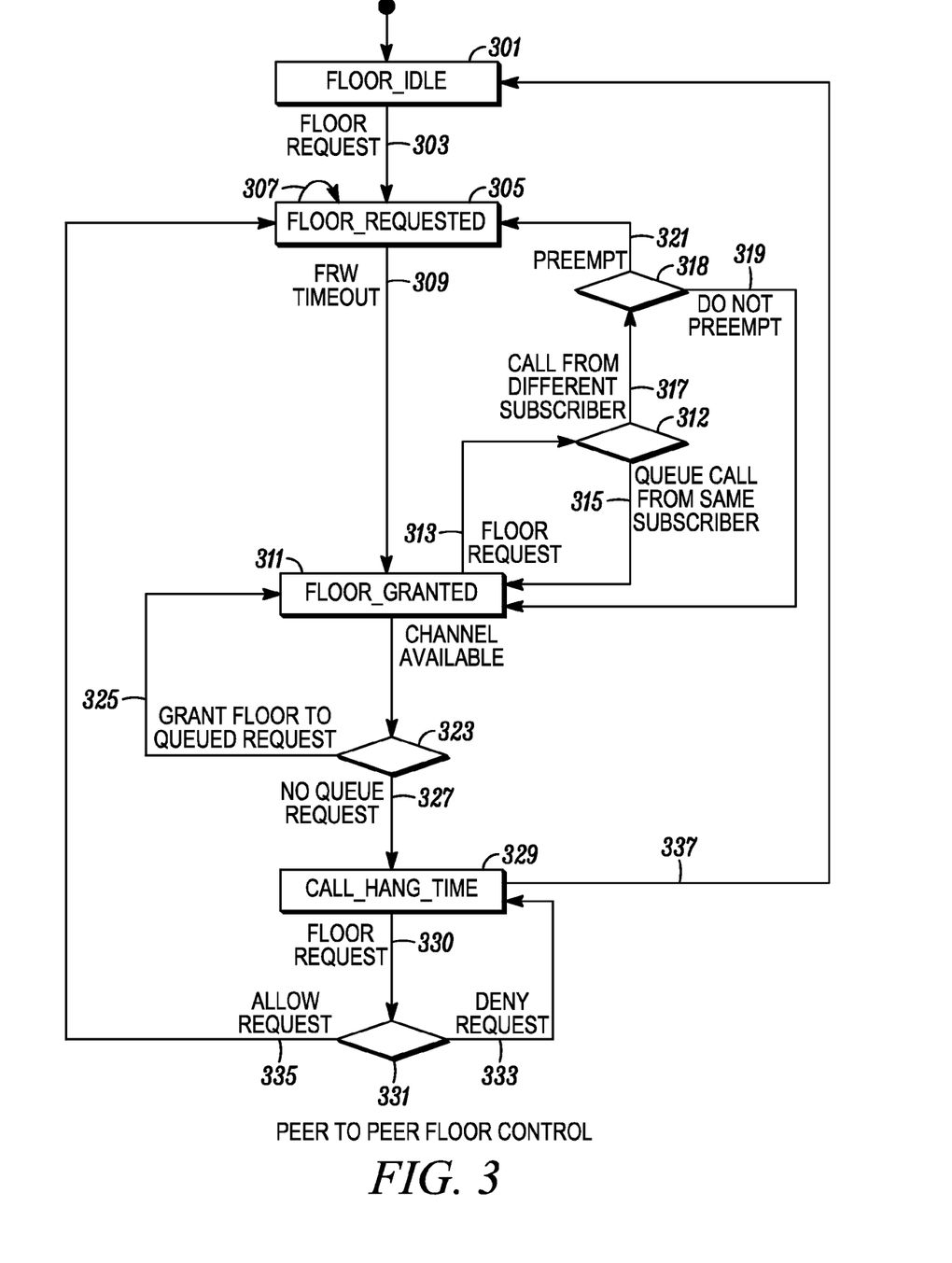
FIG. 3 is a flow chart diagram illustrating a method used for providing low overhead floor control in a distributed peer-to-peer network in accordance with an embodiment of the invention.

FIG. 3 is a flowchart diagram illustrating a method used for providing low overhead floor control in a distributed peer-to-peer network. Peers attempt to allocate the floor on a first come, first served basis. The floor of a peer is generally in an idle state when not in use 301. Because floor requests can originate from subscribers on different peers and there is no system-wide clock, the inherent system latency does not always make it possible to determine which of two floor requests was made first in time. When one or more floor requests have been raised, but the floor has not yet been granted, a floor request window is used to determine these types of conflict situations 305. Peers deal with this conflict by defining the FRW during which one or more floor requests can be received. The FRW begins when the first floor request is received by the peer 303. A floor request can be any one of the following: (a) an over the air request from a subscriber on this peer to initiate a group call; (b) an over the air request from a subscriber on this peer to initiate a private call; (c) a request from a remote peer to initiate a group call; or (d) a request from a remote peer to initiate a private call.

Once an FRW starts, additional floor requests from other peers can be received 307; however, calls from local subscribers must be rejected, unless they have a higher priority than the call that started the FRW or originate from the same subscriber that started the FRW. This policy ensures that if a floor request is made on any peer within the system, that request will be received by every peer by the end of the FRW. Additionally, the duration of the FRW must be long enough to ensure that simultaneous floor requests from other subscribers throughout the network can be received and considered for floor control. An FRW greater than or equal to twice the longest expected latency to send a message from one peer to another peer is sufficient for this purpose. This is accomplished through the use of an FRW timer. If this timer expires 309, this results in a transition to the floor granted state. All of the pending floor requests are considered and the floor is granted to one of these requests, as described in FIG. 4. If there are additional floor requests from the subscriber that wins the floor the additional requests are queued. All other floor requests are rejected. The mechanism to select which floor request is granted the floor must be consistent in all peers through the system.

By way of example, consider a talk group with members on peer 203 and peer 207. If a subscriber on peer 203 presses its Push To Talk (PTT) button to initiate a two-way radio communication or call, an FRW begins on peer 203. Peer 203 then notifies all other peers with members of the TG of the floor request, either by sending them a control message or by streaming the TG audio toward them. All other peers will receive the floor request within the longest expected message latency and will start an FRW. Once the FRW begins on a peer, no local subscribers on that peer will be permitted to request the floor. Therefore, the worst-case delay will be a subscriber on peer 203 initiates a call, and then just before the floor request notification reaches peer 207 a subscriber on peer 207 presses PTT and initiates a call. The second request must occur in less that the maximum message delay, or the FRW would have started on peer 207 and the request would not be allowed. The second floor request is then passed from peer 207 to peer 203, and must arrive there within the maximum message delay. Since the FRW on peer 203 lasts for twice the maximum message delay, the floor request from peer 207 will always arrive at peer 203 before the peer 203 FRW expires. It will be evident that the period of time before a peer may begin transmitting audio may be longer than the FRW. Before a peer can start playing audio received from another peer, the peer will fill-up a jitter buffer or other type latency memory with some predetermined number of voice samples.

Receiving an additional floor control request does not restart the FRW timing; the FRW is based only on the arrival of the first floor request. At the end of the FRW, the peer grants the floor to exactly one of the floor requests and queues or denies any other requests. The floor should always be granted to the highest priority call. If two or more calls have the same priority, some technique will need to be used to select a winner. Once a floor request has been granted to a subscriber 311, control of the floor is retained for the duration of a call session unless a new request 313 with a higher call priority than the current floor owner is received 318. Any new floor control requests of equal or lower priority are rejected when an existing session is in progress 319, unless it is a call from the same subscriber that owns the floor 315. If the new request is of higher priority than the call that owns the floor, an FRW for the new call is started and, at the end of the FRW, the floor will be granted to a higher priority call and the current call will be preempted 321.

Figure 4:
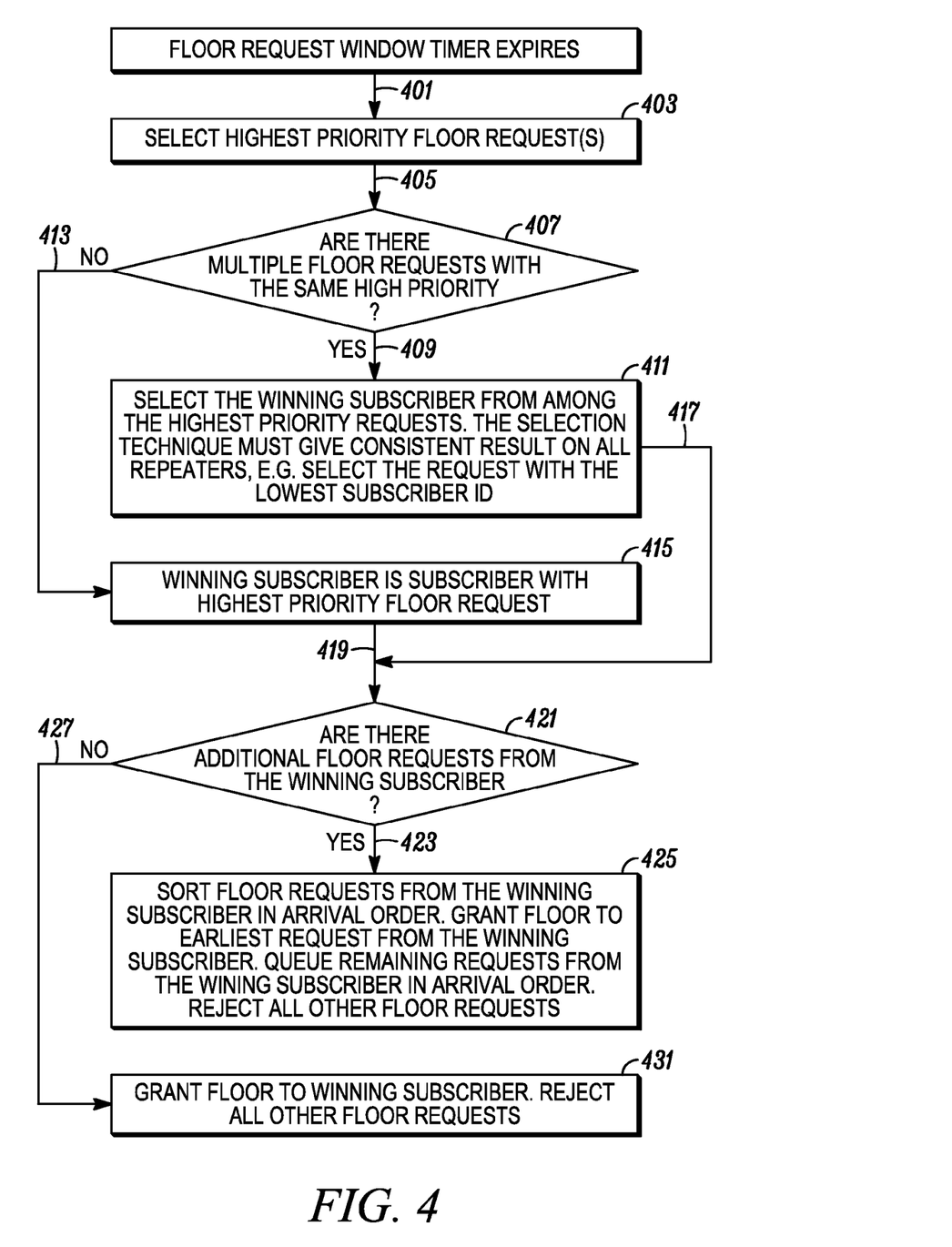
FIG. 4 is a flow chart diagram illustrating a method for selecting the subscriber that will win the floor in accordance with an embodiment of the invention.

It is possible that a peer receives multiple floor control requests 307 from the same subscriber (either local or remote) within the same FRW. A typical case where this might occur is when a subscriber sends a very short data call immediately followed by a voice call. In such situations the peer will allow both the calls to contend for the floor. However, at the end of the FRW 401, if any one of the calls of that subscriber is selected as the floor winner 411, the peer will ensure that the first call originated by that subscriber is granted the floor and the second one is queued up 425. When the first call finishes, the peer will immediately grant the floor to the second call 325.

It is possible that once the floor has been granted to a call from a particular subscriber, another call from that same subscriber can arrive at a peer 313. A typical case where this might occur is when a subscriber sends a data call (with a duration greater than the FRW) immediately followed by a voice call. In such situations, the second call will be queued 315. When the first call is completed, the peer will immediately grant the floor to the second call 325.

For a group call, a session may be defined as a half duplex voice transmission by a single member of the TG 311 followed by a group call hang time window 329. During the hang time window, floor requests from any member of the TG can be received 330 and considered for floor control 331, but floor requests 330 that are not for the TG will be rejected 333, unless they have a higher call priority than the current TG session. If a floor request from a member of the TG is received during hang time, an FRW is started 335, and, at the end of the FRW, the floor is granted 309. For a private call, a session can include multiple half duplex voice transmissions by one or both participants in the private call. The private call session begins when one of the subscribers initiates a private call to the other subscriber.

Thus, as will be evident to those of ordinary skill in the art, any session can be prematurely ended if the current call is preempted by a higher priority call 321. If a voice call is preempted by a higher priority call while one of the call participants is transmitting, the voice call session ends immediately and there is no hang time. If a higher priority floor request 330 is received during hang time, an FRW is started 335 and at the end of the FRW the floor is granted 309 to the highest priority call and the original session ends. The hang time duration for group calls and private calls could be different. For example, the hang time from groups calls could be 1 second and the private call hang time could be 500 ms. The only qualification is that the hang times must be consistent on all peers.

Thus, an embodiment of the present invention provides a system and method for providing low overhead floor control in a distributed peer-to-peer communications network where no central point of control is needed for floor allocation. The system and method have no single point of failure nor any need for an expensive central controller. The system and method further provide for consistent floor control decisions throughout the network where a choice of floor control window length that is twice the expected maximum message delay between repeaters, and the policy to block additional floor requests from local subscriber radios once an initial floor request has been received, guarantees that each repeater receives an identical set of floor requests as every other repeater within the floor control window such that every repeater will grant the floor to the same subscriber. The system further provides a low latency in delivering voice over the public internet where voice can be streamed to other repeaters as soon as it arrives over the air. Moreover, voice streaming can start even before the floor control decision is made by setting a floor control window to the minimum length needed to guarantee consistent floor control results. The system and method further allows two or more consecutive calls in rapid succession to be treated as a continuous media stream thereby enhancing the user experience. Finally, the system and method give fairness in giving all subscribers throughout the network an equal chance to win the floor when responding to a previous call such that the floor control window accounts for network delays, so subscribers located on the same repeater as the subscriber that just finished talking do not have an unfair "head start" in responding to that subscriber.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A system for providing low overhead floor control in a distributed control two-way radio communications network comprising:
    a plurality of subscriber stations; and
    a plurality of peer stations interconnected via an Internet connection using no central control,
    wherein at least one subscriber station of the plurality of subscriber stations utilizes a floor request during a timed interval for requesting floor control to at least one peer station, and
    wherein at least one of:
        the timed interval is set at approximately twice the expected maximum message delay between a first peer and a second peer,
        the at least one peer station utilizes a hang time for providing the plurality of subscribers a period to reply to a message sent by the at least one subscriber station without losing floor control, or
        each of the plurality of peer stations receive an identical set of floor requests as every other peer within the timed interval.

2. A system for providing low overhead floor control as in claim 1, wherein the timed interval is a floor request window (FRW).

3. A system for providing low overhead floor control as in claim 2, wherein only one floor request is granted at the expiration of the timed interval and all other floor requests from other subscribers are rejected.

4. A system for providing low overhead floor control as in claim 3, wherein once a floor request is granted to one subscriber, a subsequent floor request from another subscriber of equal or lower priority than a granted floor request will be rejected.

5. A system for providing low overhead floor control as in claim 3, wherein a floor request having a high priority may preempt a granted floor request.

6. A system for providing low overhead floor control as in claim 3, wherein an additional floor request from the subscriber that currently has the floor will be queued and subsequently granted the floor when the first communication is completed.

7. A system for providing low overhead floor control as in claim 2, wherein floor requests from the plurality of subscriber stations local to a peer are rejected once a floor request window has started for the at least one subscriber station.

8. A system for providing low overhead floor control as in claim 2, wherein floor requests from the plurality of subscriber stations on a different peer are allowed once a floor request window has started for the at least one subscriber station.

9. A system for providing low overhead floor control as in claim 1, wherein the timed interval is set at approximately twice the expected maximum message delay between a first peer and a second peer.

10. A system for providing low overhead floor control as in claim 1, wherein the at least one peer station utilizes a hang time for providing the plurality of subscribers a period to reply to a message sent by the at least one subscriber station without losing floor control.

11. A system for providing low overhead floor control as in claim 1, wherein upon arrival of multiple floor requests from one subscriber during a floor request window (FRW), if one of the floor requests from that one subscriber is selected to win the floor, the earliest arriving request from that one subscriber is granted the floor and the remaining requests from that one subscriber are queued and subsequently granted the floor in the order of arrival when the first communication is completed.

12. A system for providing low overhead floor control as in claim 1, wherein each of the plurality of peer stations receive an identical set of floor requests as every other peer within the timed interval.

13. A system for providing access to a floor in a two-way radio distributed control communications network comprising:
    a plurality of two-way radio subscriber stations communicating via a plurality of talk groups;
    a plurality of peers each communicating via an Internet connection and having no centralized control node
    a floor request timer associated with each of the plurality of peers; and
    wherein at least one of the subscriber stations utilizes a floor request window (FRW) for requesting floor control of at least one of the plurality of peers such that an FRW has started floor requests are rejected from the plurality of subscriber stations local to a peer and allowed for subscriber (station non-local to a peer.

14. A system for providing access as in claim 13, wherein the floor is, granted to at least one requesting subscriber station at the expiration of the FRW.

15. A system for providing access as in claim 14, wherein once a floor request is granted to one subscriber station, a subsequent floor request from another subscriber station of equal or lower priority than a granted floor request will be rejected.

16. A system for providing access as in claim 14, wherein a floor request having a high priority may preempt a granted floor request from maintaining control of the floor.

17. A system for providing access as in claim 14, wherein an additional floor request from the subscriber station that currently has the floor will be queued and subsequently granted the floor when a call involving the subscriber station is completed.

18. A system for providing access as in claim 13, wherein a timer is used to provide a delay during transmissions by the at least one subscriber station to prevent loss of control of the floor.

19. A system for providing access as in claim 13, wherein the FRW is set at approximately twice the expected maximum message delay between a first peer and a second peer.

20. A system for providing access as in claim 13, wherein each of the plurality of peers receives an identical set of floor requests as every other peer within the FRW.

21. A method for providing low overhead floor control in a distributed control two-way radio communications network comprising the steps of:
    providing a plurality of subscriber stations;
    providing a plurality of peers interconnected via an Internet connection having no central control;
    utilizing a floor request during a timed interval by at least one subscriber station of the plurality of subscriber stations for requesting floor control to at least one peer; and
    at least one of:
        a) setting the timed interval to approximately twice the expected maximum message delay between a first peer and a second peer,
        b) utilizing a delay time by the at least one peer station for providing the plurality of subscribers a period for reply to a message sent by the at least one subscriber station without losing floor control, c) receiving an identical set of floor requests for each of the plurality of peers as every other peer within the timed interval, or d) utilizing a floor request window (FRW) for the timed interval having a start time and stop time, rejecting floor requests from the plurality of subscriber stations local to a peer once an FRW has started, and allowing floor requests from the plurality of subscriber stations non-local to a peer once an FRW has started.

22. A method for providing low overhead floor control as in claim 21, further comprising the step of:
utilizing a floor request window (FRW) for the timed interval having a start time and stop time.

23. A method for providing low overhead floor control as in claim 22, further comprising the step of:
granting only one floor request at the expiration of the FRW such that all other floor requests are rejected until the end of a communication by the at least one subscriber.

24. A method for providing low overhead floor control as in claim 23, further comprising the step of:
preempting a subscriber from control of the floor if a subsequent floor request has a high priority.

25. A method for providing low overhead floor control as in claim 23, further comprising the step of:
rejecting a subsequent floor request from another subscriber of equal or lower priority than a granted floor request once a floor request is granted to the at least one subscriber.

26. A method for providing low overhead floor control as in claim 23, further comprising the step of:
queuing a subsequent floor request if the subsequent floor request is of a higher priority; and
granting the subsequent floor request when a communication with the at least one subscriber is completed.

27. A method for providing low overhead floor control as in claim 22, further comprising the step of:
rejecting floor requests from the plurality of subscriber stations local to a peer once an FRW has started; and
allowing floor requests from the plurality of subscriber stations non-local to a peer once an FRW has started.

28. A method for providing low overhead floor control as in claim 21, further comprising the step of:
setting the timed interval to approximately twice the expected maximum message delay between a first peer and a second peer.

29. A method for providing low overhead floor control as in claim 21, further comprising the step of:
utilizing a delay time by the at least one peer station for providing the plurality of subscribers a period for reply to a message sent by the at least one subscriber station without losing floor control.

30. A method for providing low overhead floor control as in claim 21, further comprising the step of:
receiving an identical set of floor requests for each of the plurality of peers as every other peer within the timed interval.

* * * * *